(12) United States Patent
Matero et al.

(10) Patent No.: US 9,420,021 B2
(45) Date of Patent: Aug. 16, 2016

(54) MEDIA DEVICE AND METHOD OF ENHANCING USE OF MEDIA DEVICE

(75) Inventors: Jyrki Matero, Oulu (FI); Juha P. Matero, Oulu (FI)

(73) Assignee: Nokia Technologies Oy, Espoo (FI)

(*) Notice: Subject to any disclaimer, the term of this patent is extended or adjusted under 35 U.S.C. 154(b) by 2613 days.

(21) Appl. No.: 11/010,757

(22) Filed: Dec. 13, 2004

(65) Prior Publication Data

US 2006/0130102 A1    Jun. 15, 2006

(51) Int. Cl.
| | |
|---|---|
| G06F 17/00 | (2006.01) |
| H04L 29/06 | (2006.01) |
| H04N 21/433 | (2011.01) |
| H04N 21/454 | (2011.01) |
| H04N 21/482 | (2011.01) |
| H04N 21/61 | (2011.01) |
| H04N 21/84 | (2011.01) |

(52) U.S. Cl.
CPC ...... *H04L 65/4076* (2013.01); *H04L 29/06027* (2013.01); *H04N 21/4334* (2013.01); *H04N 21/454* (2013.01); *H04N 21/4828* (2013.01); *H04N 21/6131* (2013.01); *H04N 21/84* (2013.01)

(58) Field of Classification Search
CPC .................... H04L 65/4076; H04L 29/06027; H04N 21/4334; H04N 21/454; H04N 21/4828; H04N 21/6131; H04N 21/84
USPC .......................................................... 700/94
See application file for complete search history.

(56) References Cited

U.S. PATENT DOCUMENTS

| | | | |
|---|---|---|---|
| 4,873,584 A | 10/1989 | Hashimoto | |
| 5,457,815 A * | 10/1995 | Morewitz, II | 455/161.1 |
| 5,798,785 A | 8/1998 | Hendricks et al. | |
| 5,826,102 A * | 10/1998 | Escobar et al. | 715/202 |
| 5,838,917 A * | 11/1998 | Paolini | 725/114 |
| 6,076,166 A | 6/2000 | Moshfeghi et al. | |
| 6,130,726 A | 10/2000 | Darbee et al. | |
| 6,278,976 B1 * | 8/2001 | Kochian | 704/500 |
| 6,463,428 B1 | 10/2002 | Lee et al. | |
| 6,536,041 B1 * | 3/2003 | Knudson et al. | 725/39 |
| 6,898,762 B2 * | 5/2005 | Ellis et al. | 715/716 |

(Continued)

FOREIGN PATENT DOCUMENTS

| | | |
|---|---|---|
| CN | 1647494 A | 7/2005 |
| CN | 1647551 A | 7/2005 |

(Continued)

OTHER PUBLICATIONS

European Search Report for GB No. 0121170.5, Date of Completion of Search—Apr. 3, 2002, 4 pages.

(Continued)

*Primary Examiner* — Paul McCord
(74) *Attorney, Agent, or Firm* — Ditthavong & Steiner, P.C.

(57) ABSTRACT

A method of enhancing the use of a media device and a media device are provided. The media device receives a broadcast media stream transmitted by a broadcast system, a service transmitted by a telecommunication system, the service being associated with a broadcast media stream and program guide information relating to a broadcast media stream. The media device is configured to detect when the service transmission comprises data corresponding to given search parameters and to record the broadcast media stream in a memory on the basis of the detection.

25 Claims, 3 Drawing Sheets

(56) References Cited

U.S. PATENT DOCUMENTS

| | | |
|---|---|---|
| 6,909,357 B1 * | 6/2005 | Bandy et al. .................. 340/5.65 |
| 6,959,221 B1 * | 10/2005 | Kataoka ........................... 700/94 |
| 6,970,641 B1 | 11/2005 | Pierre et al. |
| 7,006,881 B1 | 2/2006 | Hoffberg et al. |
| 7,024,181 B2 | 4/2006 | Savilaakso |
| 7,024,491 B1 | 4/2006 | Hanmann et al. |
| 7,062,222 B2 | 6/2006 | Boda et al. |
| 7,088,952 B1 | 8/2006 | Saito et al. |
| 7,158,753 B2 | 1/2007 | Kagan et al. |
| 7,174,126 B2 * | 2/2007 | McElhatten et al. ......... 455/3.04 |
| 7,194,235 B2 | 3/2007 | Nykanen et al. |
| 7,266,836 B2 | 9/2007 | Anttila et al. |
| 7,391,470 B2 * | 6/2008 | Kim .............................. 348/465 |
| 7,395,041 B2 | 7/2008 | Seppala et al. |
| 7,409,205 B2 | 8/2008 | Mittal |
| 7,430,232 B2 | 9/2008 | Isokoski et al. |
| 7,440,388 B2 * | 10/2008 | Tsumagari et al. ......... 369/275.3 |
| 7,840,986 B2 * | 11/2010 | Ali et al. ....................... 725/105 |
| 7,877,768 B2 * | 1/2011 | Beach et al. ..................... 725/37 |
| 2001/0047517 A1 | 11/2001 | Christopoulos et al. |
| 2002/0019984 A1 * | 2/2002 | Rakib .......................... 725/111 |
| 2002/0054751 A1 * | 5/2002 | Nakamura et al. ............. 386/46 |
| 2002/0059626 A1 | 5/2002 | Lemmons |
| 2002/0092019 A1 | 7/2002 | Marcus |
| 2002/0100052 A1 * | 7/2002 | Daniels ........................... 725/87 |
| 2002/0104092 A1 | 8/2002 | Arai et al. |
| 2002/0107739 A1 * | 8/2002 | Schlee ............................. 705/14 |
| 2002/0120925 A1 * | 8/2002 | Logan ............................. 725/9 |
| 2002/0151327 A1 | 10/2002 | Levitt |
| 2002/0174430 A1 * | 11/2002 | Ellis et al. ....................... 725/46 |
| 2002/0194601 A1 | 12/2002 | Perkes et al. |
| 2003/0005440 A1 | 1/2003 | Axelsson et al. |
| 2003/0070183 A1 * | 4/2003 | Pierre et al. .................... 725/135 |
| 2003/0093476 A1 * | 5/2003 | Syed ............................ 709/204 |
| 2003/0093790 A1 * | 5/2003 | Logan et al. .................... 725/38 |
| 2003/0114145 A1 | 6/2003 | Boda et al. |
| 2003/0146940 A1 * | 8/2003 | Ellis et al. ..................... 345/811 |
| 2003/0149988 A1 * | 8/2003 | Ellis et al. ....................... 725/87 |
| 2003/0149990 A1 | 8/2003 | Anttila et al. |
| 2003/0226147 A1 * | 12/2003 | Richmond et al. .............. 725/51 |
| 2003/0229900 A1 * | 12/2003 | Reisman ......................... 725/87 |
| 2004/0052504 A1 * | 3/2004 | Yamada et al. .................. 386/68 |
| 2004/0073927 A1 * | 4/2004 | Knudson et al. ................ 725/58 |
| 2004/0117831 A1 * | 6/2004 | Ellis et al. ....................... 725/53 |
| 2004/0122812 A1 * | 6/2004 | Yoshimura et al. .............. 707/3 |
| 2004/0156616 A1 * | 8/2004 | Strub et al. ...................... 386/46 |
| 2004/0158855 A1 * | 8/2004 | Gu et al. ......................... 725/39 |
| 2004/0181811 A1 * | 9/2004 | Rakib ........................... 725/122 |
| 2004/0198279 A1 | 10/2004 | Anttila et al. |
| 2004/0203729 A1 | 10/2004 | Makipaa et al. |
| 2004/0204851 A1 * | 10/2004 | Fukuyasu ...................... 701/213 |
| 2004/0215611 A1 * | 10/2004 | Jawa et al. ........................ 707/3 |
| 2004/0224638 A1 * | 11/2004 | Fadell et al. ................... 455/66.1 |
| 2004/0248561 A1 | 12/2004 | Nykanen et al. |
| 2005/0019016 A1 * | 1/2005 | Nakashika et al. ............. 386/95 |
| 2005/0028208 A1 * | 2/2005 | Ellis et al. ....................... 725/58 |
| 2005/0034165 A1 * | 2/2005 | Kang et al. .................... 725/111 |
| 2005/0100322 A1 * | 5/2005 | Kikuchi et al. ................. 386/95 |
| 2005/0148296 A1 | 7/2005 | Kopra et al. |
| 2005/0154599 A1 | 7/2005 | Kopra et al. |
| 2005/0170799 A1 | 8/2005 | Strandberg et al. |
| 2005/0171768 A1 * | 8/2005 | Gierach ......................... 704/208 |
| 2005/0204387 A1 * | 9/2005 | Knudson et al. ................ 725/52 |
| 2005/0235319 A1 * | 10/2005 | Carpenter et al. ............... 725/52 |
| 2005/0235324 A1 | 10/2005 | Makipaa et al. |
| 2005/0249080 A1 * | 11/2005 | Foote et al. ................... 369/59.1 |
| 2006/0009199 A1 | 1/2006 | Mittal |
| 2006/0013096 A1 * | 1/2006 | Holmes .................... 369/53.21 |
| 2006/0014490 A1 | 1/2006 | Kopra et al. |
| 2006/0015908 A1 | 1/2006 | Vermola et al. |
| 2006/0056324 A1 | 3/2006 | Hyyppa et al. |
| 2006/0078288 A1 * | 4/2006 | Huang et al. .................... 386/52 |
| 2006/0114893 A1 | 6/2006 | Tokkonen et al. |
| 2006/0116112 A1 | 6/2006 | Isokoski et al. |
| 2006/0130102 A1 * | 6/2006 | Matero et al. .................. 725/100 |
| 2006/0171684 A1 * | 8/2006 | Fukuda et al. ................. 386/112 |
| 2007/0044010 A1 | 2/2007 | Sull et al. |
| 2007/0157257 A1 | 7/2007 | Kagan et al. |

FOREIGN PATENT DOCUMENTS

| | | |
|---|---|---|
| CN | 1647552 A | 7/2005 |
| CN | 1647553 A | 7/2005 |
| CN | 1717873 A | 1/2006 |
| CN | 1993927 A | 7/2007 |
| CN | 101002410 A | 7/2007 |
| CN | 1732689 B | 6/2010 |
| CN | 1836436 B | 6/2010 |
| DE | 1202585 B | 10/1965 |
| DE | 19846452 A1 | 12/1999 |
| EP | 1202585 A2 | 5/2002 |
| EP | 1456787 A1 | 9/2004 |
| EP | 1472875 A2 | 11/2004 |
| EP | 1488545 A1 | 12/2004 |
| EP | 1497969 A2 | 1/2005 |
| EP | 1497994 A1 | 1/2005 |
| EP | 1497995 A1 | 1/2005 |
| EP | 1527534 A1 | 5/2005 |
| EP | 1579584 A1 | 9/2005 |
| EP | 1579604 A1 | 9/2005 |
| EP | 1629662 A2 | 3/2006 |
| EP | 1646002 A1 | 4/2006 |
| EP | 1761873 A1 | 3/2007 |
| EP | 1769597 A1 | 4/2007 |
| EP | 1792502 A1 | 6/2007 |
| EP | 1815676 A1 | 8/2007 |
| EP | 1817928 A1 | 8/2007 |
| FI | 116113 B | 9/2005 |
| GB | 1202585 A | 8/1970 |
| GB | 2360171 A | 9/2001 |
| GB | 2386792 A | 9/2003 |
| JP | 2002199462 A | 7/2002 |
| JP | 2006508594 A | 3/2006 |
| JP | 2006508619 A | 3/2006 |
| JP | 4146433 B2 | 9/2008 |
| KR | 20040078141 A | 9/2004 |
| KR | 1020040098061 A | 11/2004 |
| KR | 1020040102137 A | 12/2004 |
| KR | 1020050016665 A | 2/2005 |
| KR | 1020070030239 A | 3/2007 |
| KR | 100703991 B1 | 4/2007 |
| KR | 100741385 B1 | 7/2007 |
| KR | 100758588 B1 | 9/2007 |
| KR | 100777315 B1 | 11/2007 |
| KR | 1020050084034 A | 11/2007 |
| KR | 100841710 B1 | 7/2008 |
| KR | 100854531 B1 | 10/2008 |
| TW | I248732 B | 2/2006 |
| WO | 9901984 A1 | 1/1999 |
| WO | 0115449 A1 | 3/2001 |
| WO | 03003723 A1 | 1/2003 |
| WO | 03052652 A1 | 6/2003 |
| WO | 03067767 A2 | 8/2003 |
| WO | 03084098 A1 | 10/2003 |
| WO | 03090006 A2 | 10/2003 |
| WO | 03090480 A1 | 10/2003 |
| WO | 03090484 A1 | 10/2003 |
| WO | 2004004177 A1 | 1/2004 |
| WO | 2004051885 A1 | 6/2004 |
| WO | 2004055999 A1 | 7/2004 |
| WO | 2004107769 A2 | 12/2004 |
| WO | 2006006024 A1 | 1/2006 |
| WO | 2006006027 A1 | 1/2006 |
| WO | 2006027660 A1 | 3/2006 |
| WO | 2006053953 A1 | 5/2006 |
| WO | 2006056662 A1 | 6/2006 |

OTHER PUBLICATIONS

PCT International Search Report for International Application No. PCT/IB02/03428, Date of Completion of Search—Nov. 5, 2002, 3 pages.

* cited by examiner

MEDIA DEVICE AND METHOD OF ENHANCING USE OF MEDIA DEVICE

FIELD

The invention relates to a media device and enhancing use of a media device. The invention relates particularly to media devices configured to receive a broadcast media stream from a broadcast system.

BACKGROUND

Broadcasters, such as television and radio broadcasters, have taken steps forward to provide an audience with digital supplementary services, such as program information, news, weather information, competitions and other related contents, in addition to a traditional media stream. The digital supplementary services are usually delivered to the audience over the Internet using the audiences' personal computers or other media devices capable of connecting to the Internet.

More mobility is provided for the audience by media devices of cellular telecommunication systems, which media devices are equipped with a receiver, such as an FM radio, for receiving media streams broadcast by broadcasters. Broadcasters typically provide Internet services, which can be accessed by media devices, such as one equipped with a WAP (Wireless Application Protocol), capable of connecting to such a service.

Mobile users receiving media streams usually have no prior knowledge of the contents of the media streams. Thus, interesting programs or program items such as music tracks are easily missed. Broadcast media stream providers may provide a service transmission associated with the broadcast media stream which comprises information about the contents of the broadcast media stream. The information may comprise data about a program or program item being currently transmitted or the next program or program item to be transmitted. However, the service only provides the user with visual information; the user must be viewing the service transmission in order to utilize the information.

BRIEF DESCRIPTION OF THE INVENTION

An object of the invention is to enhance the use of a media device by providing an improved solution for monitoring program contents of different broadcast media streams. According to an aspect of the invention, there is provided a method of enhancing use of a media device configured to receive a broadcast media stream transmitted by a broadcast system by the media device; the method comprising: receiving over a radio interface of a cellular telecommunication system a service transmission associated with the broadcast media stream, the service transmission comprising information about the contents of the broadcast media stream; detecting when the service transmission comprises data corresponding to given search parameters; recording the broadcast media stream on the basis of the detection.

According to an aspect of the invention, there is provided a media device comprising: a receiver configured to receive a broadcast media stream transmitted by a broadcast system; a transceiver configured to communicate with a cellular telecommunication system and to receive a service transmitted over a radio interface of the cellular telecommunication system, the service being associated with at least one broadcast media stream, and to receive program guide information relating to at least one broadcast media stream; a memory for storing data; a processor connected to the receiver, transceiver and the memory, and configured to detect when the service transmission comprises data corresponding to given search parameters and to record the broadcast media stream in the memory on the basis of the detection.

According to an aspect of the invention, there is provided a method of enhancing use of a media device configured to receive a broadcast media stream transmitted by a broadcast system and to receive over a radio interface of a cellular telecommunication system a service transmission associated with the broadcast media stream, the service transmission comprising information about the contents of the broadcast media stream; the method comprising: starting reception of a broadcast media stream and the associated service, initiating recording the broadcast media stream; stopping the recording without saving if no command to continue is received from a user interface of the media device within a predetermined time period.

According to another aspect of the invention, there is provided a media device comprising: a receiver configured to receive a broadcast media stream transmitted by a broadcast system; a transceiver configured to communicate with a cellular telecommunication system and to receive a service transmitted over a radio interface of the cellular telecommunication system, the service being associated with at least one broadcast media stream, and to receive program guide information relating to at least one broadcast media stream; a memory for storing data; a user interface; a processor connected to the receiver, transceiver, user interface and the memory, and configured to initiate recording the broadcast media stream when starting reception of the broadcast media stream and the associated service and to stop the recording without saving if no command to continue is received from the user interface of the media device within a predetermined time period.

According to yet another aspect of the invention, there is provided a computer program product encoding a computer program of instructions for executing a computer process for enhancing use of a media device, the process comprising: receiving over a radio interface of a cellular telecommunication system a service transmission associated with a broadcast media stream, the service transmission comprising information about the contents of the broadcast media stream; detecting when the service transmission comprises data corresponding to given search parameters; recording the broadcast media stream on the basis of the detection.

The invention provides several advantages. In an embodiment of the invention, a media device may be configured to search a received service transmission for programs or program items according to given search parameters and record programs or program items found for later utilization. In an embodiment, also the service transmission is recorded. The user may give search parameters to the device and store the parameters for later use. Thus, the user is able to store interesting programs or program items even when not actively listening to the broadcast stream. The starting and ending times of programs or program items are read from the service transmission and the recording process is controlled completely automatically.

In an embodiment of the invention, the media device automatically starts recording a broadcast media stream when the device tunes to a new media stream channel. The recording process is terminated after a pre-determined time without saving if the user does not indicate that the process should continue.

LIST OF DRAWINGS

In the following, the invention will be described in greater detail with reference to the embodiments and the accompanying drawings, in which.

DESCRIPTION OF EMBODIMENTS

Figure 1:
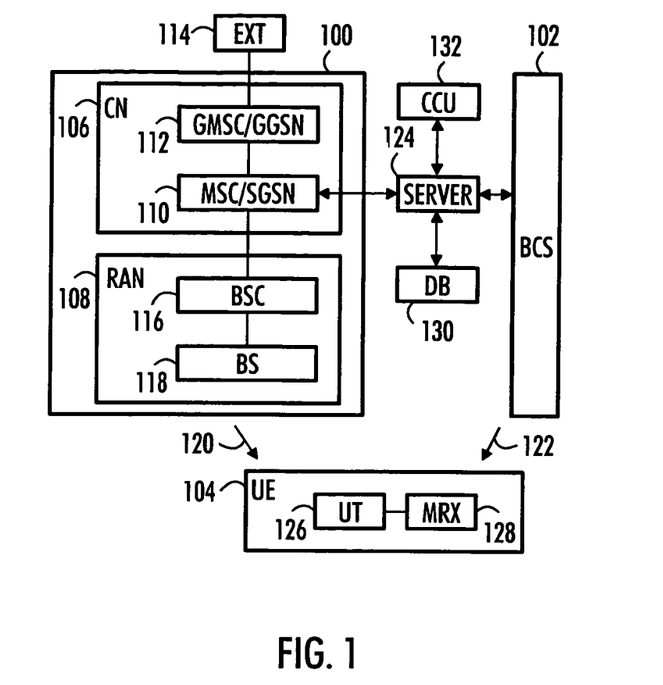
FIG. 1 illustrates an example of a system in which embodiments of the invention may be utilized.

FIG. 1 illustrates an example of a simplified structure of a system in which embodiments of the invention may be utilized. The system comprises a communication network 100 of a cellular telecommunications system, a broadcast system 102, and a media device 104 of the cellular telecommunications system.

The cellular telecommunications system is based on, for example, a GSM (Global System for Mobile Communications) or UMTS (Universal Mobile Telecommunications System). The radio interface used in the communication between the communication network and the media device may be realised using WCDMA (Wideband Code Division Multiple Access) technology, GPRS (General Packet Radio Service) or WLAN (Wireless Local Area Network), or any other similar services offering solution. The structure and functions of cellular telecommunications systems are known to a person skilled in the art, and not all network elements of the system are illustrated.

The communication network 100 provides the media device 104 with bidirectional communication services. The broadcast system 102 provides the media device 104 with a media stream 122 using, for example, a radio or television broadcast.

The communication network 110 may represent the fixed infrastructure of the cellular telecommunication system. The communication network 110 may comprise a core network (CN) 106 representing a radio-independent layer of the communication network 110, and at least one radio access network (RAN) 108. The core network 106 may include network elements of different generations of cellular telecommunications systems. The radio access network 108 provides the media device 104 with a radio interface using a radio access technology. The media device thus has a bidirectional radio connection 120 with the radio access network 108.

In the example shown in FIG. 1, the core network 106 is exemplified in terms of GSM terminology using both circuit-switched and packet-switched network elements. The packet-switched network elements are described in terms of a GPRS (General Packet Radio Service) system, which provides the media device 104 with access to external data networks over GSM and supports standard protocols, such as TCP (Transmission Control Protocol) and IP (Internet Protocol). The invention is not, however, restricted to the systems, division of systems, or protocols used in the system described in the examples, but can be applied to any cellular telecommunications system.

A center 110 represents a mobile services switching center (MSC) and a serving GPRS support node (SGSN) enabling circuit-switched and packet-switched signaling, respectively, in the cellular telecommunications system.

A function of the serving GPRS support node 110 is to transmit packets to and receive them from the media device 104 supporting packet-switched transmission. The serving GPRS support node 110 includes subscriber information and location information about the media device 104.

The core network 106 may also have a gateway unit 112 representing both a gateway mobile service switching center (GMSC) and a gateway GPRS support node (GGSN). The GMSC attends to the circuit-switched connections between the core network 106 and external networks (EXT) 114 such as a public land mobile network (PLMN) or a public switched telephone network (PSTN), and the GGSN attends to the packet-switched connections between the core network 106 and external networks 114 such as the Internet.

The center 100 controls the radio access network 108, which may comprise at least one base station controller (BSC) 116 controlling at least one base station (BS) 118. The base station controller 116 may also be called a radio network controller, and the base station 118 may be called a node B.

The system of FIG. 1 further comprises a server 124 connected to the communication network 100 and the broadcast system 102 for providing the media device 104 with a service associated with the media stream 122 by using the radio interface of the cellular telecommunication system. The server 124 may be a computer, such as a personal computer or a workstation with an interface to the communication network 100 and the broadcast system 102. The physical location of the server 124 is irrelevant as far as required connections exist. The server 124 may comprise a database 130. The 130. The database 130 may comprise computer files containing the service contents.

The server 124 may be connected to the center 110, the gateway unit 112, the radio access network 106, or other parts of the communication network 100. The server 124 may be connected to the communication network 100 via an external network 114. In an embodiment, the server 124 communicates with the communication network 100 over the radio interface of the cellular telecommunication system.

The media device 104 comprises a user terminal 126 for communicating in the cellular telecommunication system using a radio interface provided by the base station 118. The media device 104 further comprises a media receiver 128, such as an FM receiver or a television receiver, for receiving a media stream 122 provided by the broadcast system 102.

The base station 118 may communicate with the media device 104 using GPRS, in which data is transferred in packets that contain address and control data in addition to the actual content data. Several connections may employ the same transmission channel simultaneously. This kind of packet switching method is suitable for data transmission where the data to be transmitted is generated in bursts. In such a case, it is not necessary to allocate a data link for the entire duration of transmission but only for the time it takes to transmit the packets. This reduces costs and saves capacity considerably during both the set-up and use of the communication network 100.

The server 124, for example, controls the content flow between the media device 104 and the communication network 100. The server 124 may also facilitate a timed delivery of the contents of a service to the media device 104.

The media stream 122 is broadcast by the broadcast system 102. The media stream 122 may include, for example, a radio or television program, a commercial or an announcement. The media stream 122 may include speech, music, or pictures. The contents of the media stream 122, however, are irrelevant to the present solution. The media device is configured to receive the broadcast media stream 122 with the media receiver 128.

The media device may be provided with a service which is associated and/or synchronized with the broadcast media stream 122 transmitted by the broadcast system. In general, the service may provide the user of the media device with visual information related to the contents of the broadcast media stream 122. The service may be interactive. The service may include information about the music played at the moment, DJ's messages to the listeners or the like. The signal may include any of these features alone or a combination thereof. The service may include information about deliverable or purchasable objects related to the media stream, such as ring tones, desktop wallpapers or logos.

The service may be provided to the media device 104 utilizing a communication channel parallel to the broadcast channel used in delivering the media stream 122 to the user. This is called a parallel channel operation. A logical address may be dedicated to the service 120 so that the service 120 may be accessed by using the logical address of a database 130 of the server 112. The contents of the service may vary as a function of time and possibly as a function of the contents of the media stream 122. The service 120 provides a bit stream to the user equipment 110, the bit stream including information contents, such as graphical information, text information, audio information, a computer program, Braille, vibration, or any combination thereof. In an embodiment, the contents of the service 120 are displayed on a display of the user equipment 110.

A service provider is a party possessing rights for relevant digital content of the service 120, a distribution system for providing the media device 104 with the service 120, and possibly capability to bill the user for the service 120. The service provider's delivery system is responsible for receiving and handling delivery requests and delivering the service 120 to the media device 104.

In the media device 104, the service provides an integrated user experience, allowing the user to start both listening to a media stream 122 and receiving the contents of the service relating to the media stream 122. The operation of the media is based on two channels, the broadcast channel and the parallel channel enabled by the cellular telecommunication system.

In an embodiment, the service concept may be called a visual radio. The broadcast system broadcasts a radio transmission 122 received by the media device 104. The DJ or announcer of the radio transmission may advertise the service realized with the parallel channel. The user of the media device may subscribe to the service by making contact with the server and downloading suitable data which enables the user's media device to receive the service. The data may be called associating data and it may comprise information which provides a linkage between the service and the media stream and which identifies the service transmission.

The associating data may include the following types of information: a radio service address, a service identification, an object identification, a radio broadcaster identification number, a program identification number, a traffic announcement identification number, a traffic program identification number, a program item number, an emergency warning message, a music/speech indicator, a radio frequency utilized by a media stream, a program service name, a program type identification number, and a country code.

In an embodiment, the system comprises a content creation unit (CCU) 132 connected to the server 124 and the broadcast system 12 for providing contents for the service. The content creation unit 132, which can also be called a visual radio tool in some applications, may be used to create service content presentation to be displayed on the media device 104. The content creation unit 132 may be located in and integrated into the broadcast system 102, or into the server 124.

The content creation unit 132 may allow a broadcast system to create a visual presentation and manage the content flow shown on the screen of the media device 104 in synchronization with the media stream 122.

The content creation unit 132 may also define timing to display the content of the service in the media device 104 in relation to a broadcast media stream timeline.

The service may include detailed information about the contents of the broadcast transmission, such as data about programs or music tracks played in the transmission. The data may comprise names of programs, names of music tracks played in programs, music category of a music track, artists playing in a music track, and a name of an album in which a music track may be found. The data may comprise starting and ending times of programs and each music track played in the programs.

FIG. 1 shows a broadcast system 102 and a server 124. In practice, there may be several broadcast systems in the same area and each broadcast system may have a server of its own. The servers are connected to the communication network 100 in a manner similar to that in connection with the server 124. In an embodiment, the server 124 may be connected to several broadcast systems. In another embodiment, the broadcast system 102 may transmit several broadcast media streams.

Figure 2:
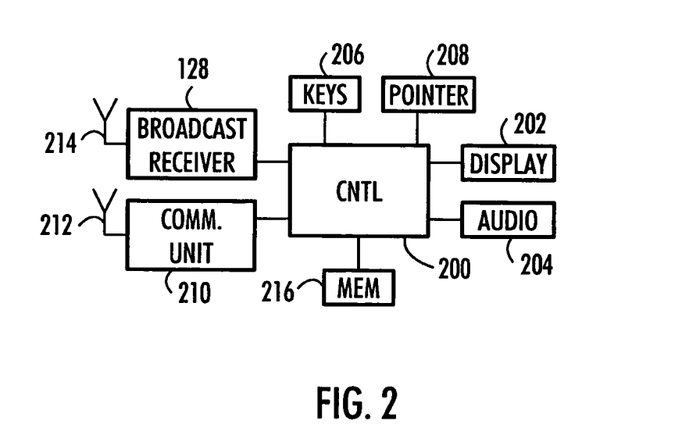
FIG. 2 illustrates an example of a media device.

With reference to FIG. 2, examine an example of a media device to which embodiments of the invention can be applied. The media device comprises a controller 200, typically implemented with a microprocessor, a signal processor or separate components and associated software. The controller controls the operation of the device, starts and executes applications and takes care of input/output functions required by the applications. The device further comprises a display 202. The display is typically configured to display graphics and text. The device may also comprise an audio interface 204, which may be realized with a speaker or a headset and a microphone, for example. The device may further comprise a keypad 206 and a pointer device 208, such as a mouse, a track stick or a touch-pad. Depending on the type of the device, the type and number of user interface parts may vary.

The media device also comprises a communication unit 210 implementing the functions of terminal equipment including speech and channel coders, modulators and RF parts. The device may also comprise an antenna 212 connected to the communication unit. The device may also comprise a broadcast receiver 128 configured to receive broadcast transmissions sent by a broadcast system. The receiver 128 is a radio or a television receiver, for example. The device may also comprise an antenna 214 connected to the broadcast receiver 128. The device may also comprise a single antenna connected both to the communication unit 210 and the broadcast receiver 128. The device also typically comprises a memory 216 for storing e.g. telephone numbers, communication parameters, broadcast receiver parameters, calendar data and other user-specific data. The memory may be realized with memory circuits or units or with detachable memory cards.

The media device is not restricted to the above example. The media device may be a personal computer, a personal digital assistant, terminal equipment or any other device comprising required communication facilities.

Figure 3:
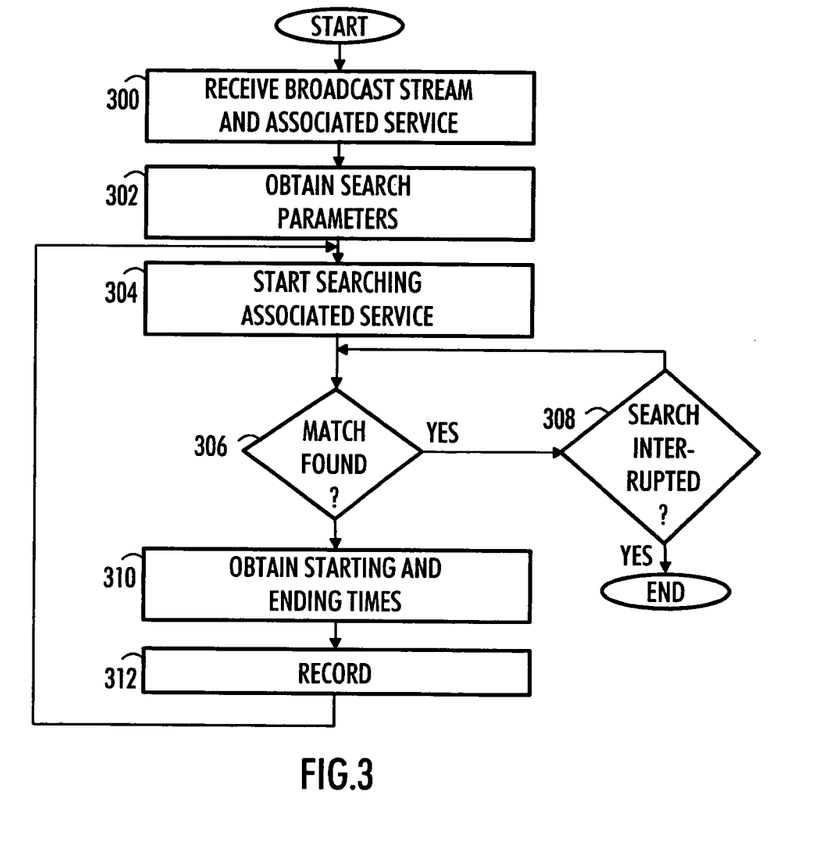
FIGS. 3 and 4 are flowcharts illustrating embodiments of the invention.

FIG. 3 is a flowchart illustrating an embodiment. In step 300, a media device 104 is receiving a broadcast media stream transmitted by a broadcast system. The media device also receives a service transmission associated with the broadcast media stream. The service is transmitted over a radio interface of a cellular telecommunication system. The service transmission comprises information about the contents of the broadcast media stream, such as data about programs or music tracks played in the transmission.

In step 302, search parameters are obtained. A user of the media device may start a search application configured to search the service transmission and the search application may further be configured to query search parameters from the user. The functions of the search application may also be integrated into another application, such as an application configured to receive and display the service transmission. The user may be given a query relating to the search parameters and the user interface of the media device may be configured to receive the parameters. Previously stored search parameters may also be retrieved from memory and the user may be given an opportunity to edit these parameters. The search parameters may comprise information about a name of a program, name of a music track, style of a music track, artist performing on a music track or names of albums in which a music track is included. Other parameters may also be defined.

In step 304, the media device 104 starts searching the service transmission. The searching may comprise monitoring or analyzing the received transmission for the selected search parameters.

In step 306, the search, or monitoring and analyzing continues. The received digital bit stream may be analyzed and compared with the search parameters. If no match is found and the search is not interrupted in step 308, the search continues. In step 308, if the search is interrupted by the user, the process ends.

If a match is found, the process continues in step 310. In this step, the found program or music track which was detected during the search is identified. The identifying may comprise detection of the starting and ending times of a program or a music track. These times may be obtained from the service transmission.

In step 312, the found program or music track is recorded. In an embodiment, also the service transmission is recorded simultaneously. The ongoing recording process may be indicated on a display of the media device 104 with a suitable sign. The recorded material may be stored in a memory of the media device. After recording, the process continues from step 304, that is, the search restarts.

The recorded programs or items are stored in a memory of the media device for later viewing.

In an embodiment, the media device does not play the broadcast media stream and the associated service using the display and speaker of the media device during the searching and recording process. Thus, the user is able to store interesting programs or program items even when not actively listening to the broadcast stream.

In an embodiment, the media device plays the broadcast media stream and the associated service also during the searching and recording process.

There may be situations wherein the starting and ending times of a music track may need modifying or adjusting in order to achieve an optimum recording result.

The media device may analyze the broadcast media stream transmission to modify the starting and ending times of a recording process. In an embodiment, the media device utilizes silence detection. The media device detects silence before and after a music track and utilizes the information when controlling the duration of the recording process.

In many cases no silent periods exist between a DJ's speech and a music track following the speech. In an embodiment, the media device utilizes spectral analysis or frequency transformation techniques to detect the starting and ending times of a music track. One typical frequency transform is the Fourier transform. Also other transform methods may be used. The media device may have stored typical transformation results of speech and music transmissions. When a transmission of a music track to be recorded is at hand, the media device may start analyzing the broadcast media stream transmission by performing a frequency transform on the received transmission. The media device may compare the result with stored values and detect when speech ends and music starts. The timing of the recording process may be fine-tuned on the basis of the analysis.

Figure 4:
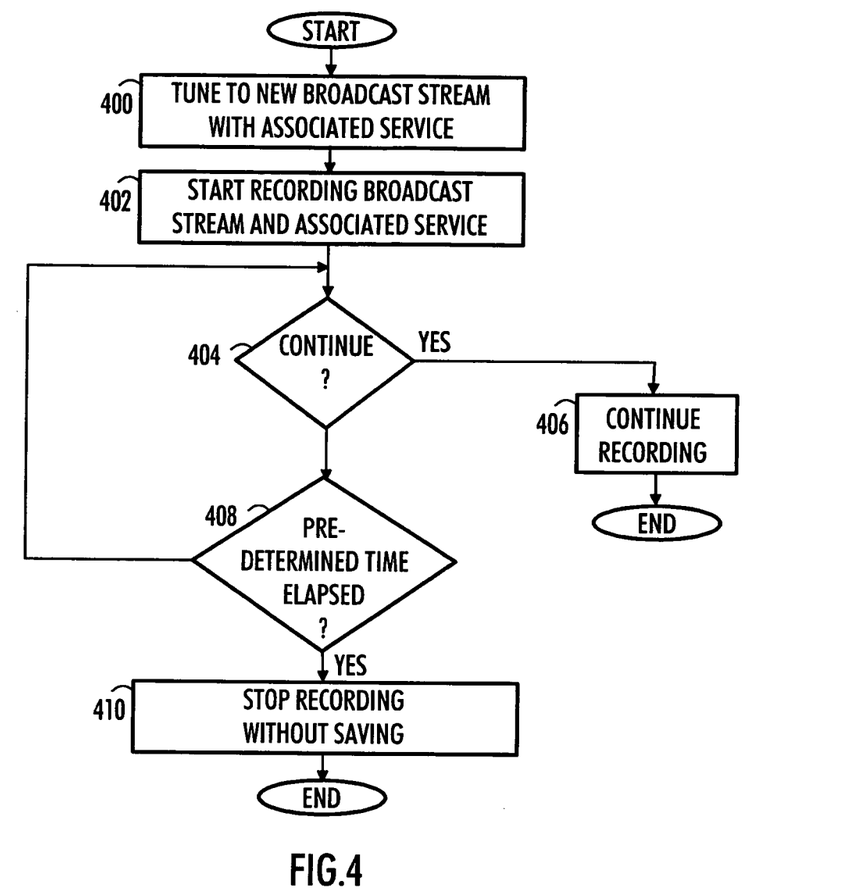

FIG. 4 is a flowchart illustrating another embodiment with a flow chart. In step 400, the media device starts receiving a broadcast media stream and an associated service.

In step 402, the media device initiates automatic recording of the broadcast media stream. The recording starts without any user action. In an embodiment, also the associated service transmission is recorded simultaneously. In an embodiment, an ongoing recording process is indicated on a display of the media device 104 with a suitable sign. Thus, the user is aware of the automatic recording process.

In step 404, the media device 104 checks whether the user has given a command to continue and store the recording. If so, the recording continues in step 406 and the recorded material is stored in a memory of the media device for later use. In an embodiment, the user is shown a query on a display of the media device. The query may comprise a message indicating that the recording process has been initiated, and a question as to whether or not to continue/discontinue the process. The user may respond to the query with a simple action.

If no continue command is received yet, the media device checks in step 408 whether a predetermined time period has elapsed since the recording started. If so, the recording is stopped in step 410 without storing. It is assumed that the user is not interested in the recorded material. The predetermined time period may be for example 5 minutes, or any other time period set by the user.

If the time period has not elapsed yet, the process continues from step 404.

In an embodiment, the invention is realized with a computer program distribution medium readable by a computer and encoding a computer program of instructions for executing a computer process for enhancing use of a media device. The process comprises: receiving over a radio interface of a cellular telecommunication system a service transmission associated with the broadcast media stream, the service transmission comprising information about the contents of the broadcast media stream; detecting when the service transmission comprises data corresponding to given search parameters and recording broadcast media stream on the basis of the detection.

The distribution medium may comprise a computer readable medium, a program storage medium, a record medium, a computer readable memory, a computer readable software distribution package, a computer readable signal, a computer readable telecommunications signal, and a computer readable compressed software package.

Even though the invention has been described above with reference to an example according to the accompanying drawings, it is clear that the invention is not restricted thereto but it can be modified in several ways within the scope of the appended claims.

The invention claimed is:
1. A method comprising:
receiving via a broadcast channel, at a media device, a broadcast media stream transmitted by a broadcast system, and concurrently receiving via a communication channel, at the media device, a service transmission at a timing synchronized with a timeline of contents in the broadcast media stream, the service transmission comprising information about the contents of the broadcast media stream;

detecting at the media device when the information comprises data corresponding to given one or more search parameters; and determining, independently from a user of the media device, to record the broadcast media stream at the media device on the basis of the detection.

2. The method of claim 1, further comprising:

receiving the search parameters from a user of the media device;

determining to store the search parameters in a memory of the media device; and determining to activate a search application at the media device to search the service transmission based on the search parameters.

3. The method of claim 1, wherein the search parameters comprise parameters of a program transmitted in the broadcast media stream or a music track played in a program.

4. The method of claim 3, wherein the search parameters further comprise information about at least one of the following:

name of a program;
name of a music track;
style of a music track;
artist performing in a music track; and
names of albums in which a music track is included.

5. The method of claim 1, further comprising:

identifying a program or a music track transmitted in the broadcast media stream on the basis of the detection;

performing a frequency transformation on the broadcast media stream;

comparing the frequency transformation with at least one stored frequency transformation to further detect starting and ending times of the program or the music track;

determining to start recording the program or a music track transmitted in the broadcast media stream at a detected starting time;

determining to end the recording at a detected ending time; and determining to store the recording in a memory of the media device.

6. The method of claim 1, further comprising:

determining to indicate an ongoing recording process on a display of the media device, wherein the broadcast media stream is transmitted at timing determined independently from a user of the media device.

7. The method of claim 1, further comprising:

determining to perform a spectral analysis on the received broadcast media stream;

comparing the spectral analysis with at least one stored spectral analysis; and controlling the recording of the broadcast media stream on the basis of the comparison.

8. The method of claim 1, further comprising:

determining to perform silence detection on the received broadcast stream; and controlling the recording of the broadcast media stream on the basis of the detection.

9. A device comprising:

a receiver configured to receive via a broadcast channel a broadcast media stream transmitted by a broadcast system, and concurrently receiving via a communication channel a service transmission at a timing synchronized with a timeline of contents in the broadcast media stream, the service transmission comprising information about the contents of the broadcast media stream;

a memory for storing data; and a processor connected to the receiver, transceiver and the memory, and configured to detect when the information comprises data corresponding to given one or more search parameters and to determine, independently from a user of the media device, to record the broadcast media stream in the memory on the basis of the detection.

10. The device of claim 9, further comprising:

a user interface configured to receive the search parameters from a user of the device, wherein the processor is further configured to determine to store the search parameters in the memory of the device, and the service transmission is received at the media device over a radio interface of a cellular telecommunication system.

11. The device of claim 9, wherein the processor is further configured to:

detect when a service transmission comprises data corresponding to the search parameters;

identify a program or a music track transmitted in the broadcast media stream on the basis of the detection;

determine to perform a frequency transformation on broadcast media stream;

compare the frequency transformation to at least one stored frequency transformation to detect starting and ending times of the program or the music track;

determine to start recording the program or music track transmitted in the broadcast media stream at a detected starting time;

determine to end recording at a detected ending time; and determine to store the recording in the memory of the device.

12. The device of claim 9, wherein the processor is further configured to:

determine to perform spectral analysis on the received broadcast stream;

compare the spectral analysis with at least one stored spectral analysis; and control the recording of the broadcast media stream on the basis of the comparison.

13. The device of claim 9, wherein the processor is further configured to:

determine to perform silence detection on the received broadcast stream; and control the recording of the broadcast media stream on the basis of the detection.

14. The method of claim 1, further comprising:

initiating recording of the broadcast media stream at the media device; and stopping the recording without saving if no command to continue is received from a user interface of the media device within a predetermined time period.

15. The method of claim 1, wherein the service transmission is received at the media device over a radio interface of a cellular telecommunication system.

16. An apparatus comprising:

at least one processor; and at least one memory including computer program code for one or more programs, the at least one memory and the computer program code being configured to, with the at least one processor, cause the apparatus to perform at least the following, receive via a broadcast channel, at a media device, a broadcast media stream transmitted by a broadcast system, and concurrently receive via a communication channel, at the media device, a service transmission at a timing synchronized with a timeline of contents in the broadcast media stream, the service transmission comprising information about the contents of the broadcast media stream;

detect when the information comprises data corresponding to given one or more search parameters; and determine, independently from a user of the media device, to record the broadcast media stream at the media device on the basis of the detection.

17. The apparatus of claim 16, wherein the apparatus is further caused to:

receive the search parameters from a user of the apparatus;

determine to store the search parameters in the memory; and determine to activate a search application stored to the apparatus to search the service transmission based on the search parameters.

18. A non-transitory computer-readable storage medium carrying one or more sequences of one or more instructions which, when executed by one or more processors, cause an apparatus to at least perform the following steps:

receiving via a broadcast channel, at a media device, a broadcast media stream transmitted by a broadcast system, and concurrently receiving via a communication channel, at the media device, a service transmission at a timing synchronized with a timeline of contents in the broadcast media stream, the service transmission comprising information about the contents of the broadcast media stream;

detecting when the information comprises data corresponding to given one or more search parameters; and determining, independently from a user of the media device, to record the broadcast media stream at the media device on the basis of the detection.

19. The computer-readable storage medium of claim 18, wherein the apparatus is caused to further perform:

receiving the search parameters from a user of the apparatus;

determining to store the search parameters in the memory; and determining to activate a search application stored to the apparatus to search the service transmission based on the search parameters.

20. The method of claim 1, further comprising:

determining to record the service transmission on the basis of the detection, wherein the service transmission is recorded substantially simultaneously with the recording of the broadcast media stream.

21. The method of claim 20, further comprising:

determining to render at the media device a visual presentation of the recorded or to be recorded contents of the media stream in synchronization with the information, wherein the contents of the service transmission transmitted via the communication channel describes the contents of the broadcast media stream transmitted via the broadcast channel while excluding the contents of the broadcast media stream.

22. The method of claim 21, wherein a service included in the service transmission provides a bit stream including Braille, vibration, or a combination thereof.

23. The method of claim 1, wherein a service transmitted via the service transmission includes disc jockey's message.

24. The method of claim 1, wherein the broadcast media stream is recorded substantially simultaneously with the detecting of the data corresponding to the search parameters.

25. The method of claim 21, wherein the visual presentation is rendered during the detecting of the data corresponding to the search parameters, during the recording of the broadcast media stream, during the recording of the service transmission, or a combination thereof.

* * * * *